United States Patent [19]
Cheshire et al.

[11] 4,086,381
[45] Apr. 25, 1978

[54] NONWOVEN POLYPROPYLENE FABRIC AND PROCESS

[75] Inventors: David Alan Cheshire; Samir Costandi Debbas, both of Hendersonville; Richard Thomas Eger, Madison, all of Tenn.; Ken Stephen Schermacher, Greenville, S.C.; Paul Thomas Twohig, Charlottesville, Va.

[73] Assignee: E. I. Du Pont de Nemours and Company, Wilmington, Del.

[21] Appl. No.: 782,961

[22] Filed: Mar. 30, 1977

[51] Int. Cl.² .............................................. B32B 5/12
[52] U.S. Cl. .................................. 428/113; 156/167; 156/306; 428/192; 428/286; 428/288; 428/298; 428/910
[58] Field of Search .............. 156/167, 306; 428/113, 428/114, 286, 288, 298, 910, 192

[56] References Cited
U.S. PATENT DOCUMENTS

| | | | |
|---|---|---|---|
| 3,360,421 | 12/1967 | Sands | 428/288 |
| 3,502,538 | 3/1970 | Peterson | 428/359 |
| 3,821,062 | 2/1972 | Henderson | 428/113 |
| 3,895,151 | 7/1975 | Matthews et al. | 428/288 |
| 3,991,244 | 11/1976 | Debbas | 428/113 |
| 3,993,812 | 11/1976 | Debbas et al. | 428/113 |

Primary Examiner—James J. Bell

[57] ABSTRACT

There is disclosed a bonded, nonwoven sheet of continuous isotactic polypropylene filaments having a nonselvage portion with specified properties rendering the sheet useful as a carpet backing, said properties including an average bond strength, for bonds having a strength greater than 0.1 gram, of at least 0.9 gram and less than the fiber breaking strength, the sheet being characterized by a selvage having an average bond strength which is from about 15–400% greater than the average bond strength of the non-selvage portion of said sheet. There is also disclosed a process for producing said sheet.

9 Claims, 2 Drawing Figures

NONWOVEN POLYPROPYLENE FABRIC AND PROCESS

BACKGROUND OF THE INVENTION

This invention is related to a nonwoven sheet which is useful as a primary carpet backing and, in particular, is related to said sheet having an improved selvage.

Nonwoven sheets of continuous, isotactic polypropylene filaments which are useful as primary carpet backing are known in the art. U.S. Pat. No. 3,502,538, issued to Petersen on Mar. 24, 1970, and U.S. Pat. No. 3,991,244, issued to Debbas on Nov. 9, 1976, disclose sheets which are representative of those found to be useful as primary carpet backing. The Petersen patent discloses a bonded nonwoven sheet comprising a matrix of synthetic organic fibers having a breaking strength of at least 7 grams, said fibers being interconnected at a multiplicity of points throughout the sheet, by at least some bonds having a strength greater than 0.1 gram, the average strength of these bonds being at least 0.9 gram and less than the matrix fiber breaking strength, the distribution of such bond strengths being characterized by a variance of at least 4, the number of said bonds being such that the product of the number of bonds per cubic centimeter and the average bond strength is greater than $5 \times 10^4$ g/cm$^3$ and this product divided by the fiber breaking strength is less than $9 \times 10^3$/cm$^3$. Sheets produced from fibers of oriented isotactic polypropylene as matrix fibers and unoriented or low oriented isotactic polypropylene fibers as binder material are disclosed as preferred.

The Debbas patent discloses a length of layered, nonwoven, bonded, continuous filament, isotactic polypropylene fabric comprising a machine direction layer at each surface of the fabric with each of the two machine direction layers constituting from 20–30% of the fabric weight and a cross-machine direction layer which constitutes from 40–60% of the fabric weight, each of said layers consisting essentially of 65–90% by weight of matrix filaments and 10–35% by weight of binder, the matrix filaments in the machine direction layers having an average denier per filament of from about 6–20 and a tenacity of at least 2.0 gpd; the matrix filaments in the cross-machine direction layer having an average denier per filament of from 26–60 and a tenacity of at least 3.0 gpd, and which is at least 10% higher than the tenacity of the matrix filaments of the machine direction layers, the filaments of the layered fabric being disposed in such a manner as to provide certain specified directionality values as measured by the randometer method, said fabric having a neckdown of 1–5%.

In the production of cut-pile carpet from primary carpet backings, such as the foregoing, the backing is tufted and the resulting pile is cut. The carpet obtained thereby is beck dyed, dried on a tentering frame, sometimes latexed, may be given a secondary backing, and then dried on a tentering frame again. During the various steps of this carpet making process, fibers and groups of fibers in the non-tufted areas of the carpet backing, i.e., the selvage, become pulled away from the body of the sheet and thereby create a highly fuzzed surface which renders the carpet unsatisfactory for further processing. Furthermore, in the beck fuzzed surfaces tend to collect loose pile fibers thereby creating "fuzz balls".

U.S. Pat. No. 3,360,421, issued to Sands on Dec. 26, 1967, is directed to this fuzz problem and discloses a nonwoven sheet suitable as a carpet backing and comprising continuous filaments disposed in random fashion and bonded to one another at a multiplicity of bond points throughout the sheet, the sheet further having, at least along the edges thereof, between about 20 and 80 perforations per square inch, the filaments in the walls of each perforation being fused together throughout the depth of the perforation. The sheet is perforated in a step which is separate from the bonding operation.

In the carpet making process, it is sometimes difficult to control precisely the area of the backing which is tufted. Thus, often, due to this lack of precise control, part of one edge of the carpet backing is also tufted. It has been found that when this occurs with a nonwoven backing having a selvage stabilized as described by the Sands patent, the backing selvage suffers a significant loss in tufted tongue tear strength, thereby resulting in rupture of the sheet selvage during tentering operations. The carpet having ruptured edges is not suitable as a "first grade" material, e.g. carpet with the desired standard width, and thus is often salvaged by trimming for uses, such as throw rugs and narrow width runners.

A primary carpet backing which would provide a selvage having high fuzz and delamination resistance while maintaining a rather high tufted tongue tear strength in said selvage would offer a rather attractive advantage in that when the variability of the tufting process results in tufting of an edge of the backing, the carpet produced thereby would still be useful as a "first grade" material. Moreover, if this carpet backing could be produced during the usual nonwoven sheet production without the requirement of a separate heating operation or special heating equipment, then the commercial feasibility of producing such a selvage-stabilized backing would be greatly enhanced.

SUMMARY OF THE INVENTION

The present invention provides a bonded, nonwoven sheet of continuous, isotactic polypropylene filaments having a breaking strength of at least 7 grams, said sheet consisting essentially of filaments and binder, said sheet having (a) a non-selvage portion in which filaments are interconnected at a multiplicity of points throughout said portion by bonds, the average bond strength for bonds having a strength greater than 0.1 gram being at least 0.9 gram and less than the fiber breaking strength, the bond strength distribution of said bonds having a variance of at least 4, the number of said bonds being such that the product of the number of bonds per cubic centimeter and the average bond strength is greater than $5 \times 10^4$ g/cm$^3$, and this product divided by the fiber breaking strength being less than $9 \times 10^3$/cm$^3$ and (b) a selvage having an average bond strength which is from about 15–400% greater than the average bond strength of the non-selvage portion of said sheet. The disclosed nonwoven sheet is prepared in a process wherein an unbonded sheet is formed by melt-spinning isotactic polypropylene filaments, drawing said or some of said filaments, and depositing said filaments on a moving belt to form a sheet, and then the thusly formed sheet is thermally bonded under restraint to provide a sheet having a non-selvage portion with the above described properties; said process having incorporated therein the improvement whereby low oriented filaments or filament segments are deposited in the selvage of the unbonded sheet so that the weight average break elongation of filaments in the selvage of the unbonded sheet is from about 360 to 800% and the ratio of said average to the weight average elongation of filaments in the non-selvage portion of the unbonded sheet is at least 1.10. The nonwoven sheet of the invention has a selvage which has adequate tufted tongue tear strength so that accidental tufting of the selvage during carpet production from said sheet will still result in a useful first grade carpet. The selvage also exhibits high fuzz and delamination resistance.

DETAILED DESCRIPTION OF THE INVENTION

Figure 1:
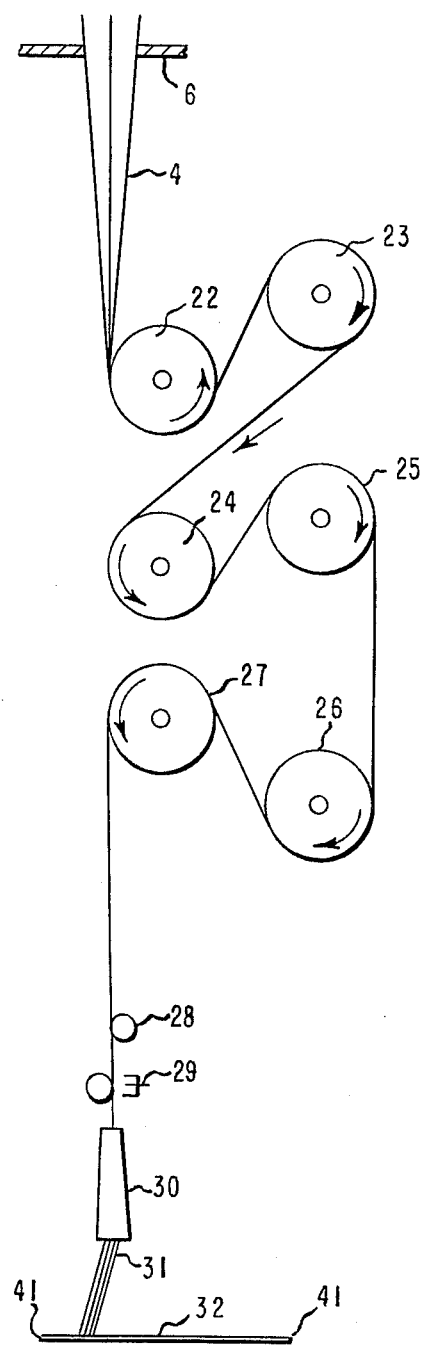
FIG. 1 is a schematic representation of an apparatus for drawing and depositing a ribbon of filaments on a moving belt.

The nonwoven sheet of the invention having a selvage with improved stability to fuzzing and delamination and having improved tufted tongue tear strength is made from an unbonded sheet having oriented isotactic polypropylene filaments and isotactic polypropylene binder in the form of filaments or filament segments. The unbonded sheet is prepared in such a manner that when it is thermally bonded the selvage of the sheet has an average bond strength which is from about 15–400%, preferably 15–100%, greater than the average bond strength of the non-selvage portion of said sheet. If the average bond strength of the selvage is less than about 15% greater than that of the non-selvage portion of the sheet, the fuzz resistance of the selvage is insufficient to avoid the creation of excessive fuzz balls during beck dyeing. If the average bond strength of the selvage is more than 400% greater than that of the non-selvage portion of the sheet, the tufted tongue tear strength of the selvage falls below the level necessary for the selvage to be able to withstand the rigors of the carpet production process and rupture of the selvage is likely to occur. The word "selvage" as used herein refers to the outer edges of the bonded nonwoven sheet in the length direction, said edges being at least two inches (5.08 cm) in width.

The novel nonwoven sheet of the invention is useful as a primary carpet backing. In general, the sheet will possess a non-selvage portion which is characterized by the properties described for the nonwoven sheets disclosed in U.S. Pat. No. 3,502,538, the teachings of which are incorporated herein by reference. Hence, the non-selvage portion of the bonded, nonwoven sheet of the invention has filaments interconnected at a multiplicity of points throughout it by bonds. Moreover, considering only bonds having an average bond strength greater than 0.1 gram, the non-selvage portion of the unbonded sheet is characterized as follows: The average bond strength, $\overline{S}$, is at least 0.9 gram and is less than the fiber breaking strength, $f$, which is at least 7 grams; the bond strength distribution is such that the variance, $\sigma^2$, is greater than 4; the number of bonds is such that the product of the number of bonds per cubic centimeter, $N_b$, and the average bond strength is greater than $5 \times 10^4$ g/cm$^3$; and this product divided by the fiber breaking strength is less than $9 \times 10^3$/cm$^3$. The fiber breaking strength as used herein is the strength in the bonded nonwoven sheet. Variance as used herein, has its accepted meaning in statistical analysis and is defined as follows:

$$\sigma^2 = \frac{\sum_{x=1}^{x=m}(\overline{S} - s_x)^2}{m-1}$$

where $\sigma^2$ is the variance, $\overline{S}$ is the arithmetic mean of the bond strengths, $s_x$ is the measured value of the individual bond strengths, and m is the number of measurements. Nonwoven sheets having these properties are known from U.S. Pat. No. 3,502,538 to possess a good tufted-grab tensile strength and low dye-beck width loss. Dye-beck width loss refers to the percent of width reduction occurring when the tufted carpet is put under tension in the length direction during the dyeing operation.

The nonwoven sheet of the invention is produced from an unbonded nonwoven sheet having filaments of oriented isotactic polypropylene as matrix filaments and unoriented or slightly oriented isotactic polypropylene filaments as binder. Alternatively, binder can be incorporated by the use of filaments of mixed orientation which have matrix filament segments of high orientation and binder filament segments which are practically undrawn or have low orientation. By virtue of the lower degree of orientation in the binder filament segments they have a lower softening point than the matrix filament segments. By choosing the proper bonding temperature, bonds comprising self-bonds between the matrix filaments, self-bonds between binder filaments or segments, and interbonds between matrix and binder filaments or segments can be produced, thus facilitating the obtainment of the required variance in bond strength distribution.

The unbonded nonwoven sheet used to produce the sheet of the invention can be prepared by the general procedure of British Pat. No. 932,482 modified as described herein. The process described in this British patent involves an integrated spinning, orientation and laydown of filaments to give a random nonwoven sheet. Nonwoven webs of filaments with segments having different levels of orientation can be produced by variation of the drawing temperature. This method can be carried out by passing the filaments over a fluted feed roll in the drawing step.

Regardless of which of the foregoing methods is used to prepare the nonwoven sheet, the method is modified so that the unbonded sheet prepared thereby will yield when bonded the sheet of the invention. The modification can be a diminution of the draw ratio for the outermost positions of the group of spinnerets being used in the laydown, generation of more filaments having a weight average break elongation of from about 400–800% in these outer positions per unit of time, or when mixed orientation filaments are being used the modification can be effected by employing for the outermost positions a feed roll with a grooved portion which is of greater magnitude than the grooved portions of the feed rolls used for the other spinneret positions.

In a preferred embodiment of the invention the bonded nonwoven sheet is a directional sheet which has a nonselvage portion having the properties somewhat similar to those of the nonwoven sheet described in U.S. Pat. No. 3,991,224. The sheet is a layered, bonded nonwoven sheet, having a machine direction layer, M, at each surface of the sheet, with each M layer constituting from 20-30% of the sheet weight, and a cross-machine direction layer, X, located between the M layers and constituting from 40-60% of the sheet weight. For the non-selvage portion of the sheet each of the layers consists essentially of 65-90% by weight of filaments having a weight average break elongation of less than 400% and 10-35% by weight of binder. Before bonding, the binder is in the form of filaments and has a weight average break elongation of from 400-800% but exist as fused or partially fused material after bonding. In each layer the filaments with a weight average break elongation of less than 400% have an average denier per filament of from about 6-60 and a tenacity of at least 2.0 gpd. The filaments of the non-selvage portion of the sheet are disposed in such a manner as to provide the following directionality values: MD/45°≧1.5, XD/45°≧1.5 and (MD + XD)/45° of from 3.5 to 30, wherein MD is a measure of the total filament length of the sheet in the sheet length direction, XD is a measure of the total filament length of the sheet in the direction perpendicular to the sheet length direction, and 45° is the average of the measures of the total filament length of the sheet in directions at 45° to the sheet length direction. Directionality is determined by the randometer method as described in U.S. Pat. No. 3,821,062. The teaching of this patent with respect to determination of directionality is incorporated herein by reference. The randometer is further described in U.S. Pat. No. 3,563,838. As used herein, the term "machine direction" refers to the sheet length direction and the term "cross-machine direction" refers to the sheet width direction. The nonwoven sheet has a neckdown of from 1-5%. The selvage of the unbonded sheet has more filaments with a higher weight average break elongation so that in the bonded sheet the average strength for bonds having a strength greater than 0.1 grams is 15-400%, preferably 15-100%, greater than the average bond strength of the non-selvage portion of the sheet. In this layered sheet the additional filaments with higher weight average break elongation can be distributed among all the layers in the selvage but are preferably incorporated in the outside layers only.

A general description of a process by which a layered nonwoven sheet can be prepared is given in U.S. Pat. No. 3,563,838, issued to Edwards on Feb. 16, 1971. An improved mechanism for melt spinning and quenching the polypropylene filaments having a large denier but high tenacity is described in U.S. Pat. No. 3,991,244. The teachings of both of these patents in this regard are incorporated herein by reference. The layered nonwoven sheet of the invention can be prepared by a modification of the process described in this latter patent. Referring to FIG. 1, bundle of filaments 4 issue from the bottom 6 of a spinneret or quench device (not shown) and becomes a ribbon of parallel filaments as it passes over roll 22. The ribbon of filaments travels successively to rolls 23, 24, 25, 26, and 27. The ribbon of filaments travels at increasingly greater speed at each successive roll. Roll 25 is a hot roll and is fluted to provide hot and cold segments. The greatest speed increase between rolls is provided between the hot roll and draw roll 26 which is a cold roll. Since roll 25 is a fluted roll with grooves running along its surface in the axial direction, segments of the yarn which touch the hot surfaces of the roll between grooves are drawn but those segments suspended over the grooved portions are not drawn to any significant degree. The filaments passing from roll 25 to roll 26 have alternate highly oriented and less oriented segments generated along their length and, thus, are of mixed orientation. The ribbon of mixed oriented filaments passes from roll 27 to guide 28. The filaments are electrostatically charged upon passing across the target bar of a corona charging device 29 such as that described in DiSabatino et al., U.S. Pat. No. 3,163,753. The ribbon of electrostatically charged continuous filaments is sucked into the entrance orifice of slot jet 30, which is similar to that shown in FIG. 6 of U.S. Pat. No. 3,563,838, and issues from the slot jet exit for deposition on moving belt 32. FIG. 1 is a view taken from the upstream end of the collecting belt 32. A pulse of air is supplied at the jet exit alternately from one side of the moving ribbon of filaments and then from the other to deflect the ribbon back and forth thereby laying down filaments predominantly aligned in one direction (cross-machine direction in FIG. 1) but of course aligned in other directions at turn around points. In commercial operation, multiple jets are used to create a row of jets for each laydown, each jet having associated with it corresponding spinneret, draw rolls, etc.

Figure 2:
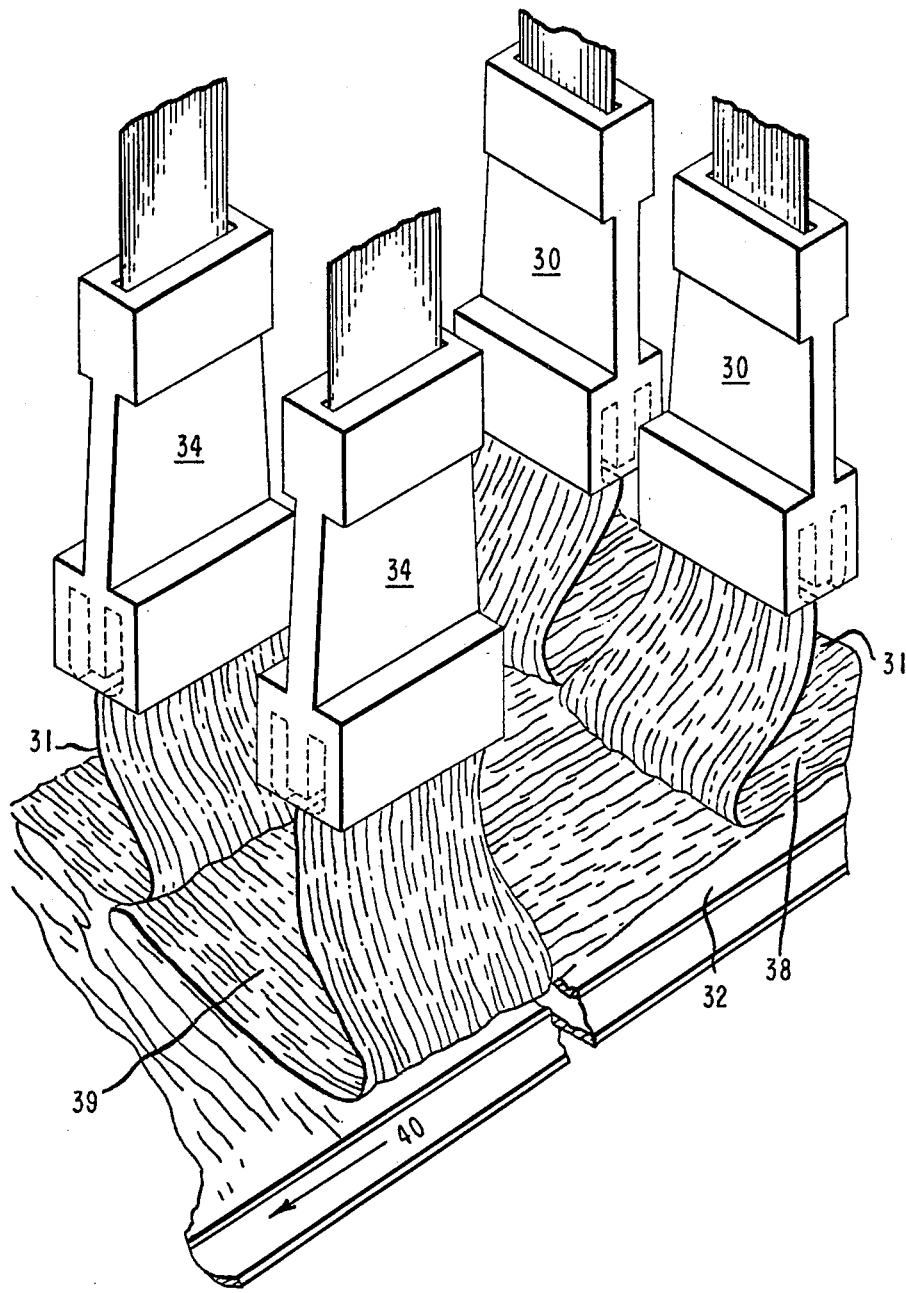
FIG. 2 is a perspective view of four air jet devices for deflecting filaments into layers each having a directionalized pattern.

The general arrangement of multiple forwarding jets over the collecting belt can be seen in FIG. 2 which shows four slot jets each forwarding a ribbon of filaments 31 to porous collecting belt 32 moving in the direction shown by arrow 40. The two upstream jets 30 are placed with the widest dimension of the slot oriented across the width of the collecting belt. The two downstream jets 34 are placed with the widest dimension of the slot oriented in the machine direction 40. The arrangement shown in FIG. 2 is for depositing layers in MX succession. For MXM laydown, another set of jets is provided downstream of jets 34 and these are oriented like jets 30 but off-set a half of a position with respect to jets 30. Also, the X laydown can be accomplished by using more than one set of such jets between the two sets of M laydown jets. It is to be understood that for the preparation of carpets a large number of jets are employed in each set. To effect the present invention, in the outermost laydown positions in each set of M laydown jets the speed of the draw rolls 26 and 27 can be lowered sufficiently so that the selvage of the sheet being preduced receives filament segments of lower orientation and hence greater elongation. A decrease in draw roll speeds so that the draw ratio decreases at least about 10% will usually be sufficient. The draw ratio, as used with regard to FIG. 1, is defined as the ratio of the surface speed of roll 26 to the surface speed of roll 22. Alternatively, there can be used in these outer positions a grooved roll 25 which has a greater grooved portion than for the other grooved rolls. Whether a difference in grooved area between the grooved rolls in these outer positions and the other grooved rolls, a lower draw ratio, or both are employed, the magnitude of the change must be sufficient to provide in the unbonded sheet being produced a selvage with filaments having a weight average break elongation of 360-800%, preferably 360-500%, and a ratio of said average to the weight average break elongation of filaments in the nonselvage portion of at least about 1.10.

The unbonded sheet is thermally bonded preferably by passage through saturated steam using a bonder of the type described in U.S. Pat. No. 3,313,002, issued to Wyeth. Excessive shrinkage is avoided by restraining the sheet during bonding. The degree of bonding affects the properties of the nonwoven product. As the bonding temperature increases, the neckdown of the tufted sheet decreases and the tufted tongue tear strength reaches a maximum and then decreases. A balance of neckdown and tufted tongue tear properties is needed for carpet backing. Nonwoven polypropylene sheets suitable for carpet backing have a neckdown of less than 5% and preferably less than 3%. Normally, this as-produced bonded sheet is trimmed to give even edges in machine direction. The process of the invention enables the production of a nonwoven sheet having a non-selvage portion possessing properties desirable for good carpet backings and a selvage which has high fuzz and delamination resistance and which, if accidentally tufted, can withstand the rigors of the carpet making process. The process of the invention enables this sheet to be produced without the need of additional equipment or process steps after the usual type of procedure for producing the backing is completed.

TEST METHODS

Average bond strength is determined according to the method described in U.S. Pat. No. 3,502,538. For the selvage a sample (5 cm × 0.32 cm) is taken at 45° to the machine direction to minimize the possibility of having filaments extended between the jaws of the Instron Tester used for the measurement. It has been observed that most of the samples measured usually have from about 150–300 bonds with a strength greater than 0.1 gram. The values of $N_b$, $N_b\overline{S}$ and $N_b\overline{S}$ are also determined by procedures similar to those described in this patent. The area of breakage which results when the sample is pulled in the Instron Tester is needed for calculation of $N_b$. This area is determined by the method described in the patent.

Directionality, percent neckdown, and fiber denier, tenacity and break elongation are measured by procedures similar to those described in U.S. Pat. No. 3,821,062. Tufted tongue tear for a cut pile carpet is determined by a method similar to that described in U.S. Pat. No. 3,991,244. As used herein, "adequate tufted tongue tear" strength means a tear strength of about 6.8 kg (15 lb) or more. "Tufted grab tensile" of a nonwoven fabric is measured by a procedure similar to that given in U.S. Pat. No. 3,502,538. The teachings of these 3 patents with regard to these various test methods are incorporated herein by reference.

Fuzz Resistance

From the bonded nonwoven sheet a sample having its machine direction edge marked is selected by cutting, starting from a machine direction edge, 25.4 (10 inches) into the sheet in the cross-machine direction and 45.7 (18 inches) in the machine direction. A similar sample is cut from the other machine direction edge of the sheet. The machine direction edge of this sample is also marked. The samples are lubricated with a silicone-glycol copolymer of the type described in U.S. Pat. No. 3,867,188. Each sample is cut pile tufted lengthwise in the center leaving the outer two inches of each lengthwise edge of the sample untufted. The two samples along with 8–14 other tufted carpet samples of about the same size are placed in a washing machine having vertical post agitation and 8.2 kg (18 lb) capacity. After the washing machine is filled with sufficient hot water, i.e., about 90° C., to cover the samples, the samples are subjected to agitation washing for about 15–16 minutes. The machine is then drained of water and the samples are spun-dried. The two marked samples are removed from the machine and shaken to eliminate any free fuzz. With a pair of scissors all visible fuzz balls on both surfaces of the marked edge of each sample are removed and the combined weight of all the fuzz balls is obtained. This weight of fuzz balls for the two samples is recorded as the weight of fuzz balls per 0.914 meters (weight per yard). In this test the size of the fuzz ball is not considered and the measurement includes fuzz balls of any visible magnitude. High fuzz resistance, as used herein, means a fuzz ball value about 230 mg or less per 0.914 meter.

Tack Tear

In this test there is used a tack bar at least 5.08 cm (2 in) long having pins 0.76 cm (0.3 in) aparts along its length and an Instron Stress Strain Tester with jaws the same or greater length as the tack bar. From a washed carpet prepared as in the fuzz resistance test a sample at least 5.08 cm (2 in) wide in the machine direction is cut-out. The sample is placed on the pins so that the pins are 3.8 cm (1.5 in) from the edge of the sheet. The Instron jaws are applied inboard of the sample edge about 7.6 cm (3 in) from the pins. The Instron Tester stretches the sample and records the stress versus strain curve on a recording chart. The maximum stress is recorded in kilograms per 5.08 cm (2 in).

Qualitative differences are noticeable between sheets with and without improved selvages. A sample without improved selvage fails by having separation of layers in the selvage, by pinholes becoming greatly deformed and by fibers becoming loose and unbonded. A sheet of the invention has little or no delamination, deformation of pinholes, or loosening of fibers in the selvage.

The invention is further illustrated by the following example. Sheets prepared in this example meet $\overline{S}$, $\sigma^2$, $N_b\overline{S}$, $N_b\overline{S}/f$ and directionality requirements set forth herein for the non-selvage portion of the sheet.

EXAMPLE 1

Apparatus similar to that shown in FIGS. 1 and 2 with four sets of jets and at least 14 jet positions in each set is used to produce an unbonded sheet. The first and fourth sets of jets are arranged to laydown filaments predominantly aligned in the machine direction and the two intermediate sets of jets are arranged to laydown filaments predominantly aligned in the cross-machine direction. Isotactic polypropylene having a melt flow rate of 3.2 ± 0.4 g/10 min. according to ASTM Method D 1238-70, procedure A, condition L, is melt-spun at a temperature of about 248° C. The drawing conditions are given in Table 1. In this experiment only the inner 13 jets of each set are utilized with the exception that for the fourth set of jets 14 jets are utilized to provide the same weight per square area in both edges. The outer spinneret positions in the first set and the outermost spinneret positions in the fourth set are operated at lower speeds for rolls 26 and 27 so to provide the draw ratios in the table. Also, the fluted grooved rolls 25 for these positions had larger grooved areas than the grooved areas of the other fluted rolls. Rolls 25 of each set all provide filament at the same linear speed. The properties of the resulting unbonded sheet are given in Table 2.

The resulting unbonded sheet is bonded by passing it through steam bonding equipment similar to that described in Wyeth, U.S. Pat. No. 3,313,002. The steam temperature in the bonder is adjusted to produce a bonded product having a neckdown of 1.7%. Bonding temperatures of from 151° to 155° C are used. The basis weight of the sheet is 129 g/m² (3.8 oz/yd²). Filament tenacities in the bonded sheet are about 10% less than in the unbonded sheet.

The average bond strength of the selvage of the resulting bonded sheet was 41% greater than the average bond strength of the non-selvage portion of the sheet. The bonded nonwoven sheet is tufted with a twisted nylon staple yarn (2 ply yarn made from singles with 2.25 cotton count) using pile height of 1.3 cm (½ in.) with needless 0.40 cm apart and 7 stitches per 2.54 cm (per inch) to produce a cut-pile carpet The properties of the carpet backing and carpet are given in Table 3. The sheet when used as a carpet backing for a cut pile carpet exhibits a high tufted tongue tear strength in the selvage of 29 lbs. The bonded sheet has a selvage fuzz value of 71 mg per 0.914 meter (per linear yard).

By comparison a control sample is produced in a similar manner without the use of different draw ratios or a different grooved roll in the outer positions. The weight average break elongation of filaments in the unbonded control sample is 358%. The bonded control sheet has high tufted tongue tear strength in both the selvage and non-selvage portions but has a selvage fuzz value of 1315 mg per linear 0.914m (per yard). This sheet is unacceptable for commercial carpet production because of its high degree of fuzzing Both sheets are subjected to the tack tear test. Although the selvage of both sheets exhibited about the same tack tear strength, the sheet of the invention exhibited little or no delamination, deformation of pinholes or loosening of fibers whereas the magnitudes of these failures were quite considerable in the control sheet.

TABLE 1
PROCESS CONDITIONS FOR FILAMENT DRAWING

| | Draw Ratio 1 | | | |
|---|---|---|---|---|
| | M | X | X | M |
| Inner positions (non-selvage) | 2.0, | 2.3, | 2.2, | 1.7 |
| Outermost positions (selvage) | 1.61, | 2.3, | 2.2, | 1.37 |

TABLE 2
UNBONDED NONWOVEN SHEET CONSTRUCTION

| | % by wt. in layers | weight average break elongation (%) | | Denier per filament for filaments with wt. average break elongation less than 400% | Tenacity, gpd, of filaments with wt. average break elongation of less than 400% | |
|---|---|---|---|---|---|---|
| | | non-selvage | selvage | | non-selvage | selvage |
| M | 25 | 354 | 454 | 11 | 3.6 | 2.9 |
| X | 25 | 329 | 329 | 21 | 4.0 | 4.0 |
| X | 25 | 325 | 325 | 22 | 4.0 | 4.0 |
| M | 25 | 426 | 500 | 13 | 3.0 | — |
| Sheet | | 358 | 401 | n.c. | n.c. | n.c. |
| M-Layers | | 388 | 475 | n.c. | n.c. | n.c. | n.c. - These values were not calculated

TABLE 3
PROPERTIES OF CARPET BACKING AND CARPET

| | $\bar{s}$ | | $\sigma^2$ | | f | | Tufted Tongue Tear Strength | Selvage Fuzz, mg/lin. 0.914m |
|---|---|---|---|---|---|---|---|---|
| | All Layers | M-Layers | All Layers | M-Layers | M | X | | |
| Non-Selvage | 1.7 | 1.2 | 20 | 16.2 | 29 g | 80 g | 21.8 kg (48 lb) | |
| Selvage | 2.4 | 2.1 | 35 | 42.2 | 29 | 80 | 13.2 kg (29 lb) | 71 |

What is claimed is:

1. A bonded, nonwoven sheet of continuous, isotactic polypropylene filaments having a breaking strength of at least 7 grams, said sheet consisting essentially of filaments and binder; said sheet having (a) a non-selvage portion in which filaments are interconnected at a multiplicity of points throughout said portion by bonds, the average bond strength for bonds having a strength greater than 0.1 gram being at least 0.9 gram and less than the fiber breaking strength, the bond strength distribution of said bonds having a variance of at least 4, the number of said bonds being such that the product of the number of bonds per cubic centimeter and the average bond strength is greater than $5 \times 10^4$ g/cm³, and this product divided by the fiber breaking strength being less than $9 \times 10^3$/cm³ and (b) a selvage having an average bond strength which is from about 15-400% greater than the average bond strength of the non-selvage portion of said sheet.

2. The sheet of claim 1 wherein the selvage has an average bond strength which is from 15-100% greater than the average bond strength of the non-selvage portion of said sheet.

3. A nonwoven sheet of claim 1 wherein said sheet is comprised of a machine direction layer at each surface of the sheet with each of the two machine direction layers constituting from about 20-30% of the sheet weight and a cross-machine direction layer which constitutes from about 40-60% of the sheet weight; the non-selvage portion of each of said layers consisting essentially of from about 65-90% by weight of filaments having a weight average break elongation of less than 400% and from 10-35% by weight of binder, filaments with a weight average elongation of less than 400% in each layer having an average denier per filament of from about 6-60 and a tenacity of at least 2.0 gpd, the filaments of the non-selvage portion of the sheet being disposed in such a manner as to provide the following directionality values; MD/45° ≧ 1.5, XD/45° ≧ 1.5 and (MD+XD)/45° of from 3.5 to 30, wherein MD is a measure of the total filament length of the sheet in the sheet length direction, XD is a measure of the total filament length of the sheet in the direction perpendicular to the sheet length direction, and 45° is the average of the measures of the total filament length of the sheet in directions at 45° to the sheet length direction, said sheet having a neckdown of from 1-5%.

4. A sheet of claim 3 wherein each machine direction layers has a selvage with an average bond strength which is from about 20 to 400% greater than the average bond strength of the non-selvage portion of said sheet.

5. The sheet of claim 3 wherein the selvage has an average bond strength which is from 15–100% greater than the average bond strength of the non-selvage portion of said sheet.

6. In a process for preparing a nonwoven sheet of continuous filaments of isotactic polypropylene wherein an unbonded sheet is formed by melt-spinning isotactic polypropylene filaments, drawing said or some of said filaments, and depositing said filaments on a moving belt and the thusly formed sheet is then thermally bonded under restraint to provide a sheet having a non-selvage portion as described in claim 1, the improvement comprising depositing in the selvage of said unbonded sheet filaments or filament segments having low orientation such that the weight average break elongation of filaments in the selvage is from about 360–800% and the ratio of weight average break elongation of filaments in the selvage to weight average break elongation of filaments in the non-selvage portion of said unbonded sheet is at least about 1.10.

7. The process of claim 6 wherein the weight average break elongation of filaments in the selvage is from 360–500%.

8. In a process for preparing a nonwoven sheet of continuous filaments of isotactic polypropylene wherein an unbonded sheet is formed by melt-spinning isotactic polypropylene filaments, drawing said or some of said filaments, and depositing said filaments on a moving belt and the thusly formed sheet is then thermally bonded under restraint to provide a sheet having a non-selvage portion as described in claim 3, the improvement comprising depositing in the selvage of the outer layers of said unbonded sheet filaments or filament segments having low orientation such that the weight average break elongation of filaments in the selvage of the outer layers is from about 400–800% and the ratio of weight average break elongation of filaments in the selvage to weight average break elongation of filaments in the non-selvage portion of said outer layers is at least 1.20.

9. The process of claim 8 wherein the weight average elongation of filaments in the selvage of the outer layers is from about 400–600%.

* * * * *